(12) United States Patent
Honermann et al.

(10) Patent No.: US 8,939,383 B2
(45) Date of Patent: Jan. 27, 2015

(54) ADHESIVELY BONDED FRAME SECTION FOR AGRICULTURAL SPRAYER BOOM

(75) Inventors: John Paul Honermann, Benson, MN (US); Scott David Reese, New London, MN (US)

(73) Assignee: CNH Industrial America LLC, New Holland, PA (US)

( * ) Notice: Subject to any disclaimer, the term of this patent is extended or adjusted under 35 U.S.C. 154(b) by 736 days.

(21) Appl. No.: 13/097,318

(22) Filed: Apr. 29, 2011

(65) Prior Publication Data

US 2012/0273590 A1 Nov. 1, 2012

(51) Int. Cl.
B05B 1/20 (2006.01)
A01C 23/00 (2006.01)
A01M 7/00 (2006.01)

(52) U.S. Cl.
CPC ............ *A01C 23/008* (2013.01); *A01M 7/0071* (2013.01)
USPC ........... 239/167; 239/159; 239/163; 239/166; 239/172; 239/600; 239/602; 403/267; 156/60

(58) Field of Classification Search
USPC ......... 239/159, 161, 163, 166, 167, 168, 172, 239/600, 602, DIG. 19; 403/265–267; 156/60
See application file for complete search history.

(56) References Cited

U.S. PATENT DOCUMENTS

| | | | |
|---|---|---|---|
| 4,147,217 | A | 4/1979 | Hawkins, Jr. |
| 4,254,802 | A | 3/1981 | Kaufmann et al. |
| 4,427,154 | A | 1/1984 | Mercil |
| 4,711,398 | A | 12/1987 | Ganderton et al. |
| 6,164,559 | A | 12/2000 | Knight |
| 6,966,501 | B2 | 11/2005 | Wubben et al. |
| D559,274 | S | 1/2008 | Chahley et al. |
| 7,354,235 | B2 | 4/2008 | Hettiger |
| 7,740,190 | B2 | 6/2010 | Peterson et al. |
| 7,828,329 | B2 | 11/2010 | Biscan |
| 2008/0187427 | A1 | 8/2008 | Durney |
| 2012/0275847 | A1* | 11/2012 | Bouten ......................... 403/267 |

FOREIGN PATENT DOCUMENTS

| | | |
|---|---|---|
| DE | 10338380 A1 | 3/2005 |
| EP | 0464291 A1 | 1/1992 |
| GB | 2098842 A | 12/1982 |

* cited by examiner

*Primary Examiner* — Steven J Ganey
(74) *Attorney, Agent, or Firm* — Rebecca L. Henkel

(57) ABSTRACT

An adhesively bonded frame section for an agricultural sprayer boom is provided. One agricultural sprayer boom section includes a first support member and a second support member disposed adjacent to the first support member. The boom section also includes a side plate adhesively bonded to a first lateral side of the first support member, and to a first lateral side of the second support member to couple the first support member to the second support member.

13 Claims, 7 Drawing Sheets

ADHESIVELY BONDED FRAME SECTION FOR AGRICULTURAL SPRAYER BOOM

BACKGROUND

The invention relates generally, but not limited, to agricultural equipment, and more particularly, to an adhesively bonded frame section for an agricultural sprayer boom.

Various types of agricultural vehicles (e.g., sprayers, floaters, applicators, etc.) are employed to deliver fertilizer, pesticides, herbicides, or other products to the surface of a field. Such agricultural vehicles typically include a boom configured to facilitate product delivery over wide swaths of soil. In certain configurations, the boom is suspended from a rear frame of the vehicle, and extends laterally outward from a center frame section. As a result of this configuration, the entire weight of the boom is supported by the agricultural vehicle. As will be appreciated, longer booms cover wider swaths of soil, but exert an increased load on the agricultural vehicle at the location where the suspended boom is coupled to the vehicle. Consequently, larger/more powerful vehicles are typically employed to accommodate longer booms. Unfortunately, the acquisition and operating costs of the larger/more powerful vehicles significantly increases the overhead associated with crop production and increases soil compaction.

BRIEF DESCRIPTION

In one embodiment, an agricultural sprayer boom section includes a first support member and a second support member disposed adjacent to the first support member. The boom section also includes a side plate adhesively bonded to a first lateral side of the first support member, and to a first lateral side of the second support member to couple the first support member to the second support member.

In another embodiment, a method of manufacturing an agricultural sprayer boom section includes disposing a first support member adjacent to a second support member. The method also includes applying an adhesive layer to at least one of a first lateral side of the first support member and a side plate, and at least one of a first lateral side of the second support member and the side plate. The method includes disposing the side plate on the first lateral side of the first support member, and on the first lateral side of the second support member. The method also includes curing the adhesive layer to couple the first support member to the second support member.

In another embodiment, a boom section manufactured by a method includes disposing a first support member adjacent to a second support member. The method also includes applying an adhesive layer to at least one of a first lateral side of the first support member and a side plate, and at least one of a first lateral side of the second support member and the side plate. The method includes disposing the side plate on the first lateral side of the first support member, and on the first lateral side of the second support member. The method also includes curing the adhesive layer to couple the first support member to the second support member.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
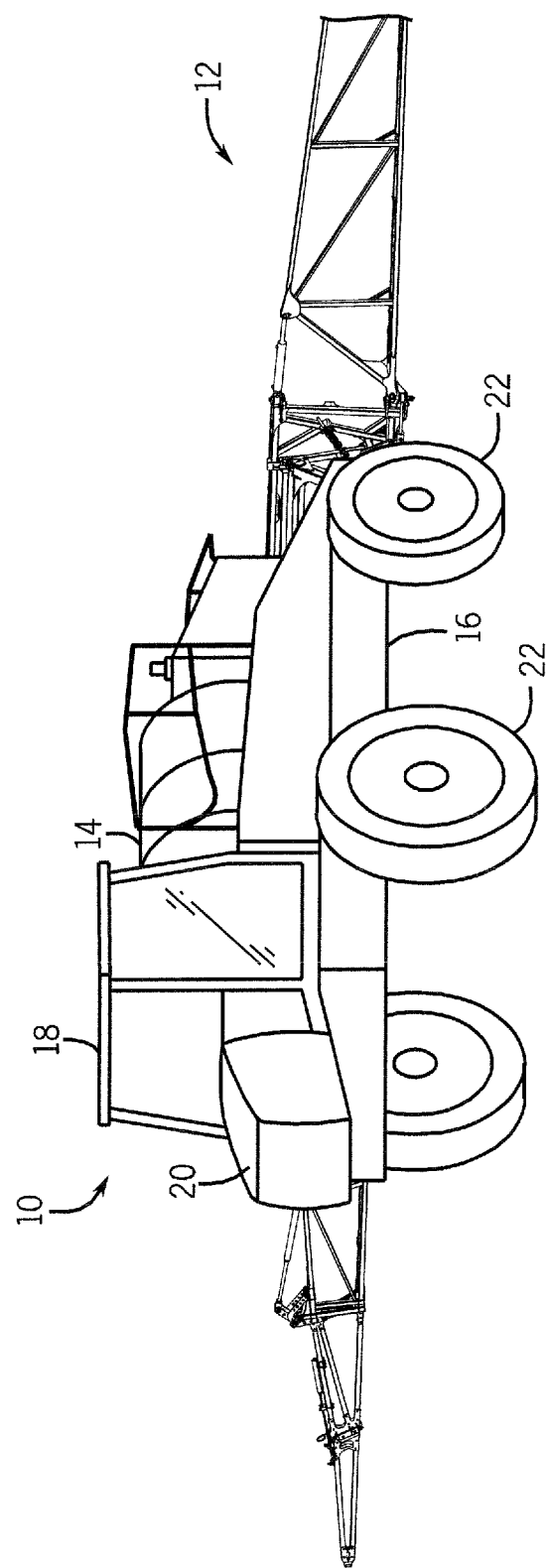
FIG. 1 is a perspective view of an embodiment of an agricultural vehicle having a suspended boom that may employ adhesively bonded boom sections.

FIG. 1 is a perspective view of an embodiment of an agricultural vehicle 10 having a suspended boom 12 that may employ adhesively bonded boom sections. The agricultural vehicle 10 includes a tank 14 where materials, such as fertilizer, pesticide, herbicide, and/or other products, are stored for distribution to a field. As illustrated, the agricultural vehicle 10 also includes a frame 16, a cab 18, and a hood 20. The frame 16 provides structural support for the cab 18, the hood 20, and the tank 14. Furthermore, the cab 18 provides an enclosed space for an operator, and the hood 20 houses the engine and/or systems configured to facilitate operation of the vehicle 10. The agricultural vehicle 10 also includes wheels 22 configured to support the frame 16, and to facilitate movement of the vehicle across the field.

The suspended boom 12 is coupled to the agricultural vehicle 10 by a mast 24 that supports the weight of the boom 12. The mast 24, in turn, is coupled to the agricultural vehicle 10 by a linkage assembly (e.g., parallel linkage, four-bar linkage, etc.) that facilitates height adjustment of the boom 12 relative to the soil surface. When distributing product, the suspended boom 12 extends laterally outward from the agricultural vehicle 10 to cover large swaths of soil, as illustrated. However, to facilitate transport, each lateral wing of the suspended boom 12 may be folded forwardly or rearwardly into a transport position, thereby reducing the overall width of the vehicle. As discussed in detail below, certain sections of the suspended boom 12 may be manufactured using an adhesive bonding process. For example, side plates may be adhesively bonded to adjacent support members to couple the support members to one another.

Because the adhesive bonding process enables coupling of dissimilar materials (e.g., steel and aluminum), the material of each support member may be particularly selected to provide a lightweight boom that has a desired strength/structural rigidity. For example, a boom that employs adhesively bonded steel and aluminum support members may be significantly lighter than a boom having all steel support members welded to one another. The reduced boom weight decreases the load applied to the vehicle 10, thereby enabling the use of smaller/less powerful vehicles and decreases soil compaction. Due to the decreased acquisition and operating costs of the smaller/less powerful vehicles, the overhead associated with crop production may be significantly reduced.

Figure 2:
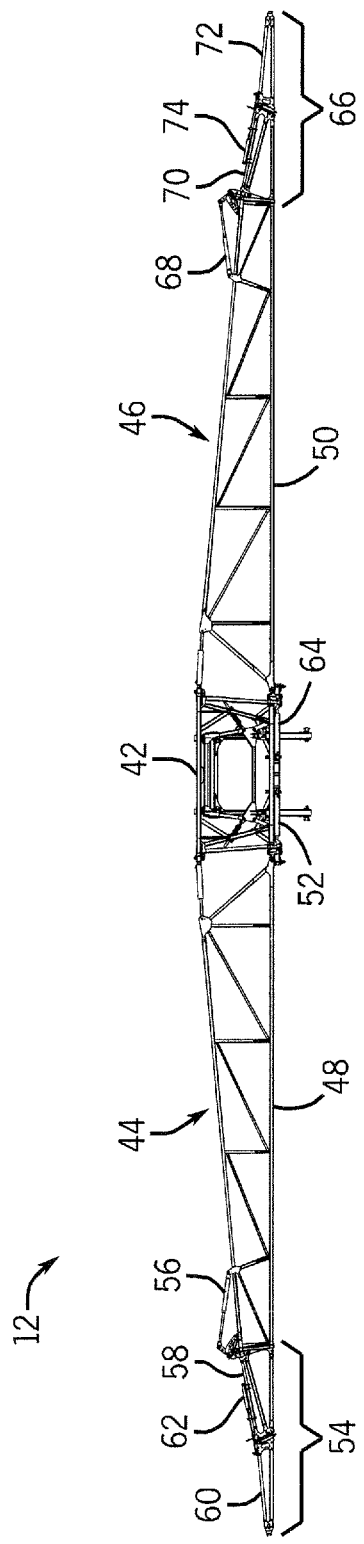
FIG. 2 is a front view of an embodiment of a suspended boom that may be employed within the agricultural vehicle of FIG. 1.

FIG. 2 is a front view of an embodiment of a suspended boom 12 that may be employed within the agricultural vehicle of FIG. 1. The suspended boom 12 includes a center section 42, a first wing assembly 44, and a second wing assembly 46.

As previously discussed, the center section 42 is configured to couple to the agricultural vehicle 10 via a mast and linkage assembly that facilitates height adjustment of the boom 12 relative to the soil surface. In addition, the center section 42 is configured to support the wing assemblies 44 and 46 during operation and transport. As illustrated, the wing assemblies 44 and 46 are coupled to opposite lateral sides of the center section 42. Specifically, an inner section 48 of the first wing assembly 44 is pivotally coupled to one lateral side of the center section 42, and an inner section 50 of the second wing assembly 46 is coupled to an opposite lateral side of the center section 42. In this configuration, the wing assemblies 44 and 46 may be folded forwardly or rearwardly from the illustrated working position to a transport position that reduces the overall width of the vehicle.

In the illustrated embodiment, the first wing assembly 44 includes an actuating cylinder 52 (e.g., electrical, hydraulic, and/or pneumatic cylinder) extending between the inner section 48 and the center section 42. The cylinder 52 may be fluidly coupled to a fluid power supply that provides pressurized fluid to drive a piston rod to extend and retract. It should be appreciated that the fluid power supply may be hydraulic or pneumatic, thereby powering the hydraulic or pneumatic cylinder 52. The first side assembly 44 is illustrated in an open, or product distribution, position with the piston rod extending from the cylinder 52. However, when the piston rod is retracted into the cylinder 52, the first side assembly 44 transitions to a transport position.

The first wing assembly 44 also includes an outer portion 54 having an actuating cylinder 56. As illustrated, the outer portion 54 is coupled to the inner section 48 by a pivotal joint. Like the cylinder 52, the actuating cylinder 56 may be an electrical, hydraulic, and/or pneumatic cylinder configured to displace a piston rod extending from the cylinder 56. Retracting the piston rod of the cylinder 56 will cause the outer portion 54 to rotate forwardly, rearwardly, or upwardly from the illustrated product distribution/working position to a transport position. In the illustrated embodiment, the outer portion 54 includes an outer section 58, a breakaway section 60, and a spring 62. The outer section 58 extends between the inner section 48 and the breakaway section 60. The spring 62 enables the breakaway section 60 to flexibly move over or around another object.

The structure of the second wing assembly 46 is similar to the structure of the first wing assembly 44. Specifically, the second wing assembly 46 includes an actuating cylinder 64 extending between the inner section 50 and the center section 42. In addition, the second wing assembly 46 also includes an outer portion 66 having an actuating cylinder 68. As illustrated, the outer portion 66 is coupled to the inner section 50 by a pivotal joint. Furthermore, the outer portion 66 includes an outer section 70, a breakaway section 72, and a spring 74. The outer section 70 extends between the inner section 50 and the breakaway section 72. The actuating cylinders 64 and 68 each may be electrical, hydraulic, and/or pneumatic cylinder configured to displace a piston rod extending from the cylinders 64 and 68.

As discussed in detail below, certain sections of the suspended boom 12 are manufactured using an adhesive bonding process. For example, the outer sections 58 and 70, and/or the breakaway sections 60 and 72 may be formed by adhesively bonding side plates to adjacent support members. Furthermore, the center section 42, the inner sections 48 and 50, and/or sections of the outer portions 54 and 66 may be formed by adhesively bonding side plates to adjacent support members. As discussed in detail below, the adhesive bonding process facilitates coupling between aluminum and steel support members (or support members formed from other materials), thereby facilitating the use of lighter weight aluminum components throughout the boom 12. As will be appreciated, the use of lighter weight materials will reduce the overall weight of the boom 12. For example, if the outer sections 58 and 70 and/or the breakaway sections 60 and 72 are formed from at least some aluminum support members, the suspended boom 12 will be lighter than a boom formed completely from steel support members. According to certain embodiments, using bonded boom sections constructed with lighter materials may decrease the weight of the boom by approximately 10 to 60 percent. By way of example, the lighter materials may decrease the weight of the boom by approximately 40 percent.

Figure 3:
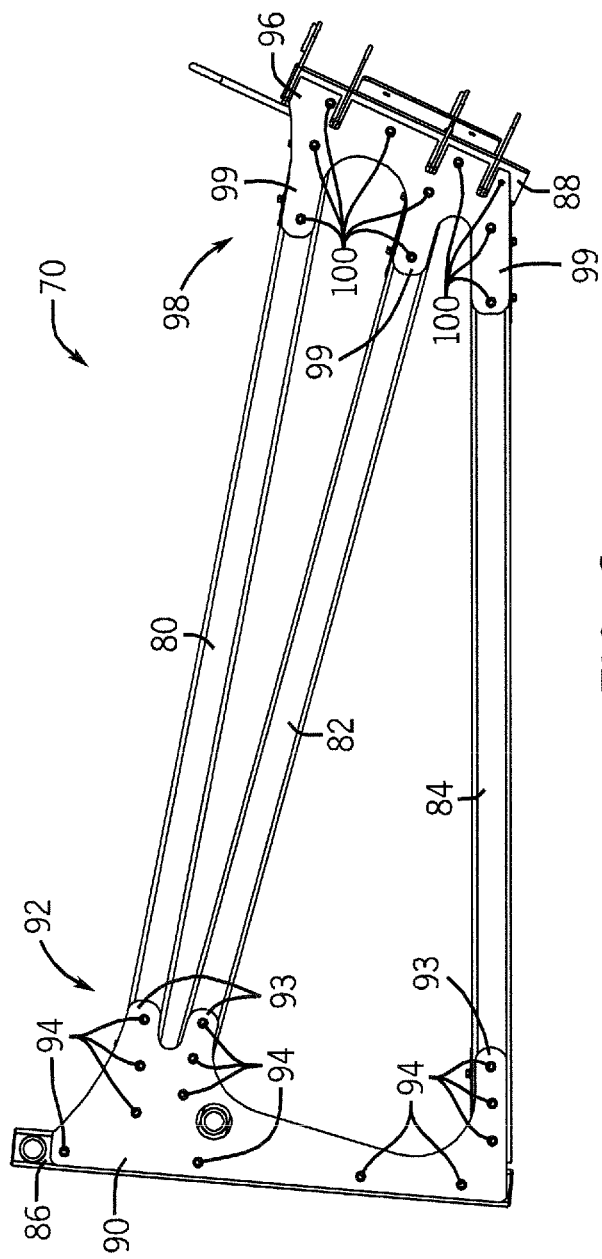
FIG. 3 is a front view of an embodiment of an outer section of the boom of FIG. 2.

FIG. 3 is a front view of an embodiment of an outer section 70 of the boom 12 of FIG. 2. As illustrated, the outer section 70 includes multiple support members, including longitudinal tubes 80, 82, and 84, and cross tubes 86 and 88. The tubes 80, 82, 84, 86, and 88 are coupled to one another to provide a frame configured to support a product distribution system that may be attached to the section 70. The tubes 80, 82, 84, 86, and 88 may be formed from steel, aluminum, a metal alloy, or other suitable material (e.g., plastic, fiberglass, etc.). In certain embodiments, the longitudinal tubes 80, 82, and 84 are formed from aluminum, and the cross tubes 86 and 88 are formed from steel.

In the illustrated embodiment, a first side plate 90 is adhesively bonded to a first longitudinal end 92 of the longitudinal tubes 80, 82, and 84, and to the cross tube 86. Specifically, the first side plate 90 is adhesively bonded to the tubes 80, 82, 84, and 86 via an adhesive layer. Consequently, the first side plate 90 couples the tubes 80, 82, 84, and 86 to one another to form a portion of the outer section 70. The first side plate 90 may be formed from steel, aluminum, carbon fiber, or any other suitable material (e.g., plastic, fiberglass, etc.). For example, in certain embodiments, the first side plate 90 is formed from steel. The adhesive layer used to bond the tubes 80, 82, 84, and 86 to the first side plate 90 may be any suitable bonding material, such as epoxy, vinylester resin, or polyester resin, for example. For example, in certain embodiments, the adhesive layer may include Loctite® H8510™ manufactured by Henkel of Düsseldorf, Germany. Because the adhesive bonding process enables coupling of dissimilar materials (e.g., steel and aluminum), the material of each support member may be particularly selected to provide a lightweight boom that has a desired strength/structural rigidity. For example, in certain embodiments, the longitudinal tubes may be formed from aluminum, and the cross tubes may be formed from steel. In such embodiments, the resulting boom section may be significantly lighter than a boom section having all steel support members welded to one another.

As discussed in detail below, the adhesive layer is applied to the side plate 90 and/or the tubes 80, 82, 84, and 86 prior to disposing the side plate onto the tubes. Furthermore, the side plate 90 includes three protrusions 93 extending down the length of the longitudinal tubes 80, 82, and 84. As may be appreciated, the bonding strength of the adhesive layer may be increased by extending the protrusions 93 or otherwise increasing the bonding area between the side plate 90 and the tubes 80, 82, 84, and 86. Once the first side plate 90 is attached to the tubes 80, 82, 84, and 86, fasteners 94 are inserted through the first side plate 90 and into the tubes 80, 82, 84, and 86 to secure the first side plate 90 to the tubes 80, 82, 84, and 86 at least while the adhesive layer cures. In certain embodiments, the fasteners 94 may remain attached to the completed boom section to enhance the strength and/or rigidity of the structure. It should be noted that the fasteners 94 are not necessary to hold the first side plate 90 to the tubes 80, 82, 84, and 86, therefore, in some embodiments, the fasteners 94 are not used.

In the illustrated embodiment, a second side plate 96 is adhesively bonded to a second longitudinal end 98 of the longitudinal tubes 80, 82, and 84, and to the cross tube 88. Specifically, the second side plate 96 is adhesively bonded to the tubes 80, 82, 84, and 88 via an adhesive layer. Like the first side plate 90, the second side plate 96 couples the tubes 80, 82, 84, and 88 to one another to form a portion of the outer section 70. As with the first side plate 90, the second side plate 96 may be formed from steel, aluminum, carbon fiber, or any other suitable material (e.g., plastic, fiberglass, etc.). For example, in certain embodiments, the second side plate 96 is formed from steel. As discussed in detail below, the adhesive layer is applied to the side plate 96 and/or the tubes 80, 82, 84, and 86 prior to disposing the side plate onto the tubes. Furthermore, the side plate 96 includes three protrusions 99 extending down the length of the longitudinal tubes 80, 82, and 84. As may be appreciated, the bonding strength of the adhesive layer may be increased by extending the protrusions 99 or otherwise increasing the bonding area between the side plate 96 and the tubes 80, 82, 84, and 88.

Once the second side plate 96 is attached to the tubes 80, 82, 84, and 88, fasteners 100 are inserted through the second side plate 96 and into the tubes 80, 82, 84, and 88 to secure the second side plate 96 to the tubes 80, 82, 84, and 88 at least while the adhesive layer cures. In certain embodiments, the fasteners 100 may remain attached to the completed boom section to allow the boom section to be removed from an assembly fixture prior to completion of the curing process, or in some embodiments, the fasteners 100 may remain attached to the completed boom section to enhance the strength and/or rigidity of the structure. It should be noted that the fasteners 100 are not necessary to hold the second side plate 96 to the tubes 80, 82, 84, and 88, therefore, in some embodiments, the fasteners 100 are not used. Securing support members to one another via an adhesive bonding process may substantially reduce the duration associated with boom section construction. For example, certain manufacturing processes involve welding support members to one another to form the boom section frame. As will be appreciated, such processes may be complex and time-consuming. Therefore, by replacing the welding process with the bonding process, boom sections may be manufactured more efficiently, thereby decreasing manufacturing costs.

Figure 4:
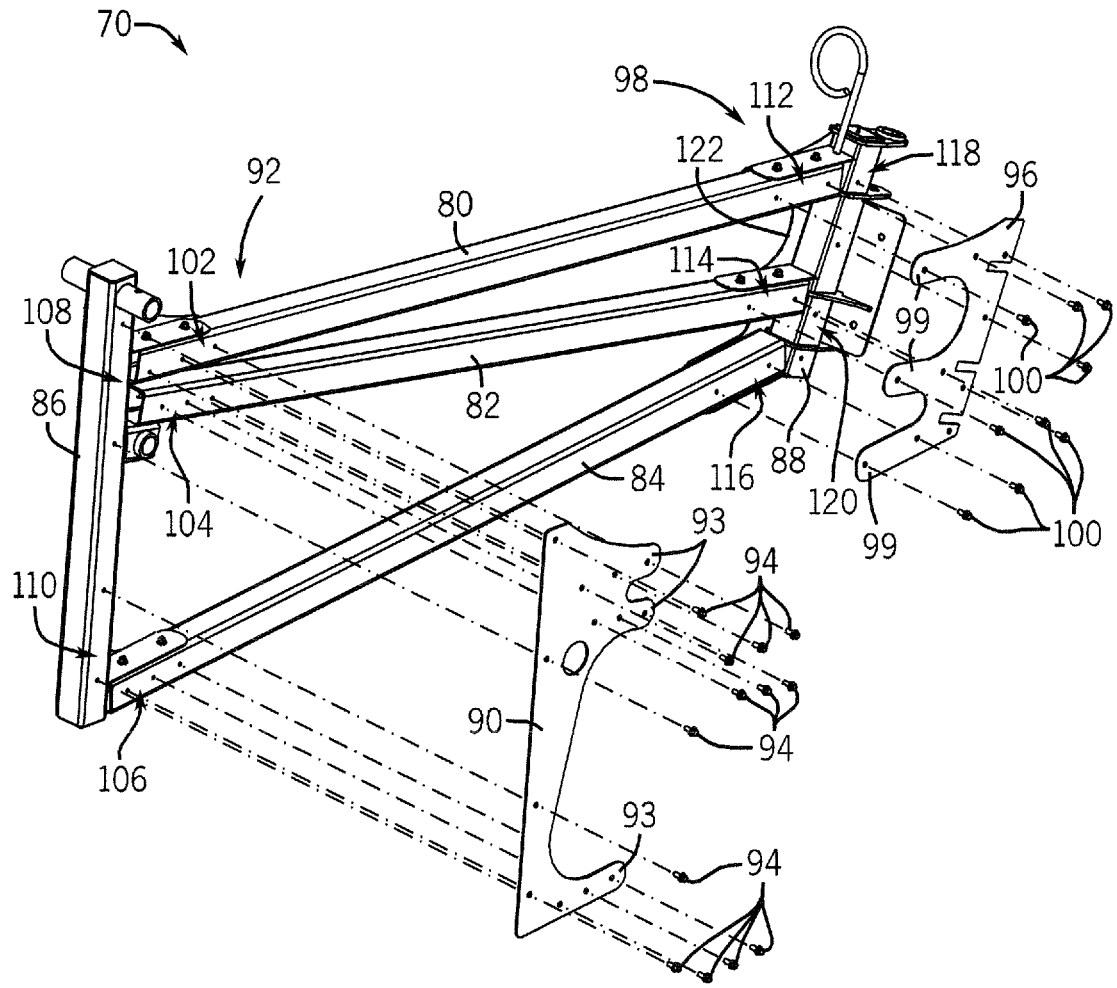
FIG. 4 is an exploded view of the outer boom section of FIG. 3.

FIG. 4 is an exploded view of the outer boom section 70 of FIG. 3. During the manufacturing process, an adhesive layer is applied at a location 102 on a first lateral side of the longitudinal tube 80, at a location 104 on a first lateral side of the longitudinal tube 82, at a location 106 on a first lateral side of the longitudinal tube 84, at a location 108 on a first lateral side of the cross tube 86, at a location 110 on the first lateral side of the cross tube 86, and/or on a surface of the first plate 90 facing the tubes. The first plate 90 is then disposed onto the tubes, and the adhesive layer is allowed to cure. To ensure that the side plate remains coupled to the tubes during the curing process, the fasteners 94 are inserted through the first plate 90 and secured to the tubes 80, 82, 84, and 86. Once the adhesive layer cures, the side plate 90 secures the tubes to one another, thereby forming a portion of the boom section.

The second side 98 is manufactured in a similar manner to the first side 92. As such, during the manufacturing process an adhesive layer is applied at location 112 on the first lateral side of the longitudinal tube 80, at a location 114 on the first lateral side of longitudinal tube 82, at a location 116 on the first lateral side of the longitudinal tube 84, at a location 118 on a first lateral side of the cross tube 88, at a location 120 on the first lateral side of the cross tube 88, and/or on a surface of the second plate 96 facing the tubes. The second plate 96 is then disposed onto the tubes, and the adhesive layer is allowed to cure.

To ensure that the side plate remains coupled to the tubes during the curing process, the fasteners 100 are inserted through the second plate 96 and secured to the tubes 80, 82, 84, and 88. Once the adhesive layer cures, the side plate 96 secures the tubes to one another, thereby forming a portion of the boom section. As depicted, a third side plate 122 is disposed on a second lateral side, opposite the first lateral side, of the second longitudinal end 98 of the longitudinal tubes 80, 82, and 84. The third plate 122 may be adhesively bonded to the tubes 80, 82, 84, and 88 in a similar manner to the first and second plates 90 and 96. Furthermore, a fourth side plate may be adhesively bonded to the second lateral side of the first longitudinal end 92 of the longitudinal tubes 80, 82, and 84. The four side plates may serve to enhance the strength and/or structural rigidity of the boom section.

Securing tubes to one another via an adhesive bonding process may reduce the overall weight of the boom 12. For example, the adhesive bonding processes facilitate coupling between aluminum and steel tubes, thereby facilitating the use of lighter weight aluminum components throughout the boom 12. Therefore, if the outer section 70 is formed from at least some aluminum support members, the suspended boom 12 will be lighter than a boom formed completely from steel support members. Furthermore, the outer section 70 may be formed without welding tubes to one another, and replacing the welding process with the bonding process, thereby manufacturing the outer section 70 more efficiently and decreasing manufacturing costs.

Figure 5:
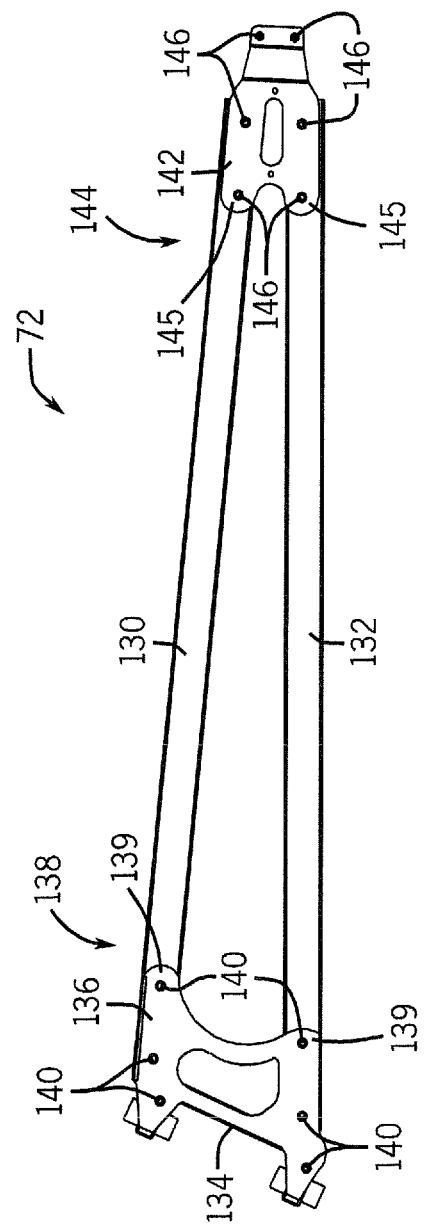
FIG. 5 is a front view of an embodiment of a breakaway section of the boom of FIG. 2.

FIG. 5 is a front view of an embodiment of a breakaway section 72 of the boom 12 of FIG. 2. As illustrated, the breakaway section 72 includes multiple support members, including longitudinal tubes 130 and 132, and a cross tube 134. The tubes 130, 132, and 134 are coupled to one another to provide a frame configured to support a product distribution system that may be attached to the section 72. The tubes 130, 132, and 134 may be formed from steel, aluminum, a metal alloy, or other suitable material (e.g., plastic, fiberglass, etc.). In certain embodiments, the longitudinal tubes 130 and 132 are formed from aluminum, and the cross tube 134 is formed from steel.

In the illustrated embodiment, a first side plate 136 is adhesively bonded to a first longitudinal end 138 of the longitudinal tubes 130 and 132, and to the cross tube 134. Specifically, the first side plate 136 is adhesively bonded to the tubes 130, 132, and 134 via an adhesive layer. Consequently, the first side plate 136 couples the tubes 130, 132, and 134 to one another to form a portion of the breakaway section 72. The first side plate 136 may be formed from steel, aluminum, carbon fiber, or any other suitable material (e.g., plastic, fiberglass, etc.). For example, in certain embodiments, the first side plate 136 is formed from steel. As described in relation to FIG. 3, the adhesive layer may be any suitable bonding material, such as epoxy, vinylester resin, or polyester resin, for example.

Because the adhesive bonding process enables coupling of dissimilar materials (e.g., steel and aluminum), the material of each support member may be particularly selected to provide a lightweight boom that has a desired strength/structural rigidity. For example, in certain embodiments, the longitudinal tubes may be formed from aluminum, and the cross tubes may be formed from steel. In such embodiments, the resulting boom section may be significantly lighter than a boom section having all steel support members welded to one another. Furthermore, the side plate 136 includes two protrusions 139 extending down the length of the longitudinal tubes 130 and 132. As may be appreciated, the bonding strength of the adhesive layer may be increased by extending the protrusions 139 or otherwise increasing the bonding area between the side plate 136 and the tubes 130, 132, and 134. Once the first side plate 136 is attached to the tubes 130, 132, and 134, fasteners 140 are inserted through the first side plate 136 and into the tubes 130, 132, and 134 to secure the first side plate 136 to the tubes 130, 132, and 134 at least while the adhesive layer cures. In certain embodiments, the fasteners 140 may remain attached to the completed boom section to enhance the strength and/or rigidity of the structure. It should be noted that the fasteners 140 are not necessary to hold the first side plate 136 to the tubes 130, 132, and 134, therefore, in some embodiments, the fasteners 140 are not used.

In the illustrated embodiment, a second side plate 142 adhesively bonded to a second longitudinal end 144 of the longitudinal tubes 130 and 132. Specifically, the second side plate 142 is adhesively bonded to the tubes 130 and 132 via an adhesive layer. Like the first side plate 136, the second side plate 142 couples the tubes 130 and 132 to one another to form a portion of the breakaway section 72. As with the first side plate 136, the second side plate 142 may be formed from steel, aluminum, carbon fiber, or any other suitable material (e.g., plastic, fiberglass, etc.). For example, in certain embodiments, the second side plate 142 is formed from steel. As discussed in detail below, the adhesive layer is applied to the side plate 142 and/or the tubes 130 and 132 prior to disposing the side plate onto the tubes. Furthermore, the side plate 142 includes two protrusions 145 extending down the length of the longitudinal tubes 130 and 132. As may be appreciated, the bonding strength of the adhesive layer may be increased by extending the protrusions 145 or otherwise increasing the bonding area between the side plate 142 and the tubes 130 and 132.

Once the second side plate 142 is attached to the tubes 130 and 132, fasteners 146 are inserted through the second side plate 142 and into the tubes 130 and 132 to secure the second side plate 142 to the tubes 130 and 132 at least while the adhesive layer cures. In certain embodiments, the fasteners 146 may remain attached to the completed boom section to allow the boom section to be removed from an assembly fixture prior to completion of the curing process, or in some embodiments, the fasteners 146 may remain attached to the completed boom section to enhance the strength and/or rigidity of the structure. It should be noted that the fasteners 146 are not necessary to hold the second side plate 142 to the tubes 130 and 132, therefore, in some embodiments, the fasteners 146 are not used. Securing support members to one another via an adhesive bonding process may substantially reduce the duration associated with boom section construction. For example, certain manufacturing processes involve welding support members to one another to form the boom section frame. As will be appreciated, such processes may be complex and time-consuming. Therefore, by replacing the welding process with the bonding process, boom sections may be manufactured more efficiently, thereby decreasing manufacturing costs.

Figure 6:
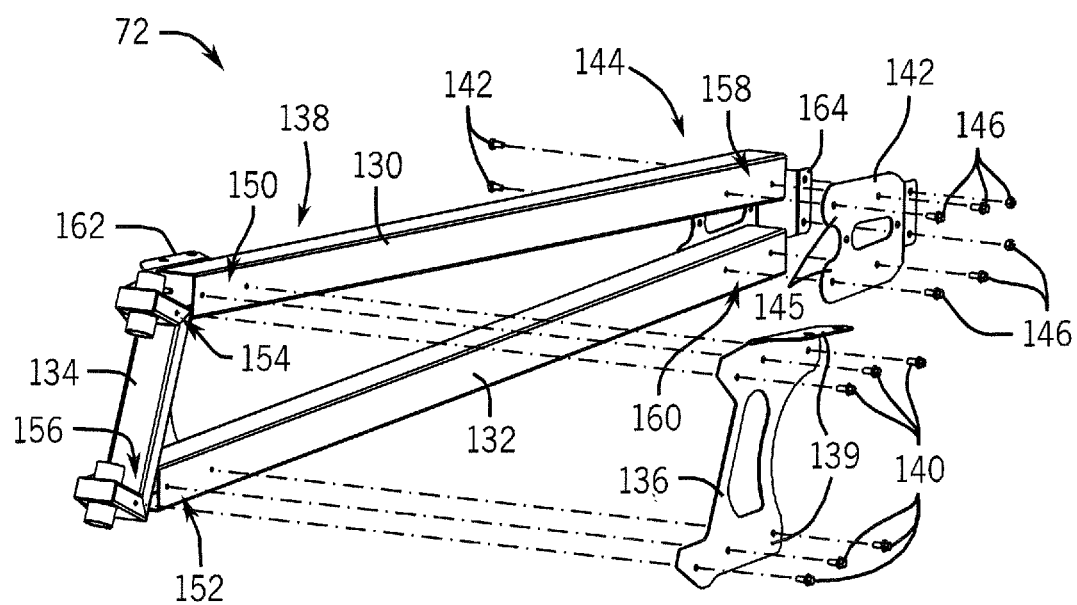
FIG. 6 is an exploded view of the breakaway boom section of FIG. 5.

FIG. 6 is an exploded view of the breakaway boom section 72 of FIG. 5. During the manufacturing process an adhesive layer is applied at location 150 on a first lateral side of the longitudinal tube 130, at a location 152 on a first lateral side of the longitudinal tube 132, at a location 154 on a first lateral side of the cross tube 134, at a location 156 on the first lateral side of the cross tube 134, and/or on a surface of the first plate 136 facing the tubes. The first plate 136 is then disposed onto the tubes, and the adhesive layer is allowed to cure. To ensure that the side plate remains coupled to the tubes during the curing process, the fasteners 140 are inserted through the first plate 136 and secured to the tubes 130, 132, and 134. Once the adhesive layer cures, the side plate 136 secures the tubes to one another, thereby forming a portion of the boom section.

The second side 144 is manufactured in a similar manner to the first side 138. As such, during the manufacturing process an adhesive layer is applied at location 158 on the first lateral side of the longitudinal tube 130, at a location 160 on the first lateral side of the longitudinal tube 132, and/or on a surface of the second plate 142 facing the tubes. The second plate 142 is then disposed onto the tubes, and the adhesive layer is allowed to cure. To ensure that the side plate remains coupled to the tubes during the curing process, the fasteners 146 are inserted through the second plate 142 and secured to the tubes 158 and 160. Once the adhesive layer cures, the side plate 142 secures the tubes to one another, thereby forming a portion of the boom section. As depicted, a third side plate 162 is disposed on a second lateral side, opposite the first lateral side, of the first longitudinal end 138 of the longitudinal tubes 130 and 132. The third plate 162 may be adhesively bonded to the tubes 130, 132, and 134 in a similar manner to the first and second plates 136 and 142. Furthermore, a fourth side plate 164 is disposed on a second lateral side, opposite the first lateral side, of the second longitudinal end 144 of the longitudinal tubes 130 and 132. The fourth plate 164 may be adhesively bonded to the tubes 130 and 132 in a similar manner to the first and second plates 136 and 142.

Securing tubes to one another via an adhesive bonding process may reduce the overall weight of the boom 12. For example, the adhesive bonding processes facilitate coupling between aluminum and steel tubes, thereby facilitating the use of lighter weight aluminum components throughout the boom 12. Therefore, if the breakaway section 72 is formed from at least some aluminum support members, the suspended boom 12 will be lighter than a boom formed completely from steel support members. Furthermore, the breakaway section 72 may be formed without welding tubes to one another, and replacing the welding process with the bonding process, thereby manufacturing the breakaway section 72 more efficiently and decreasing manufacturing costs.

Figure 7:
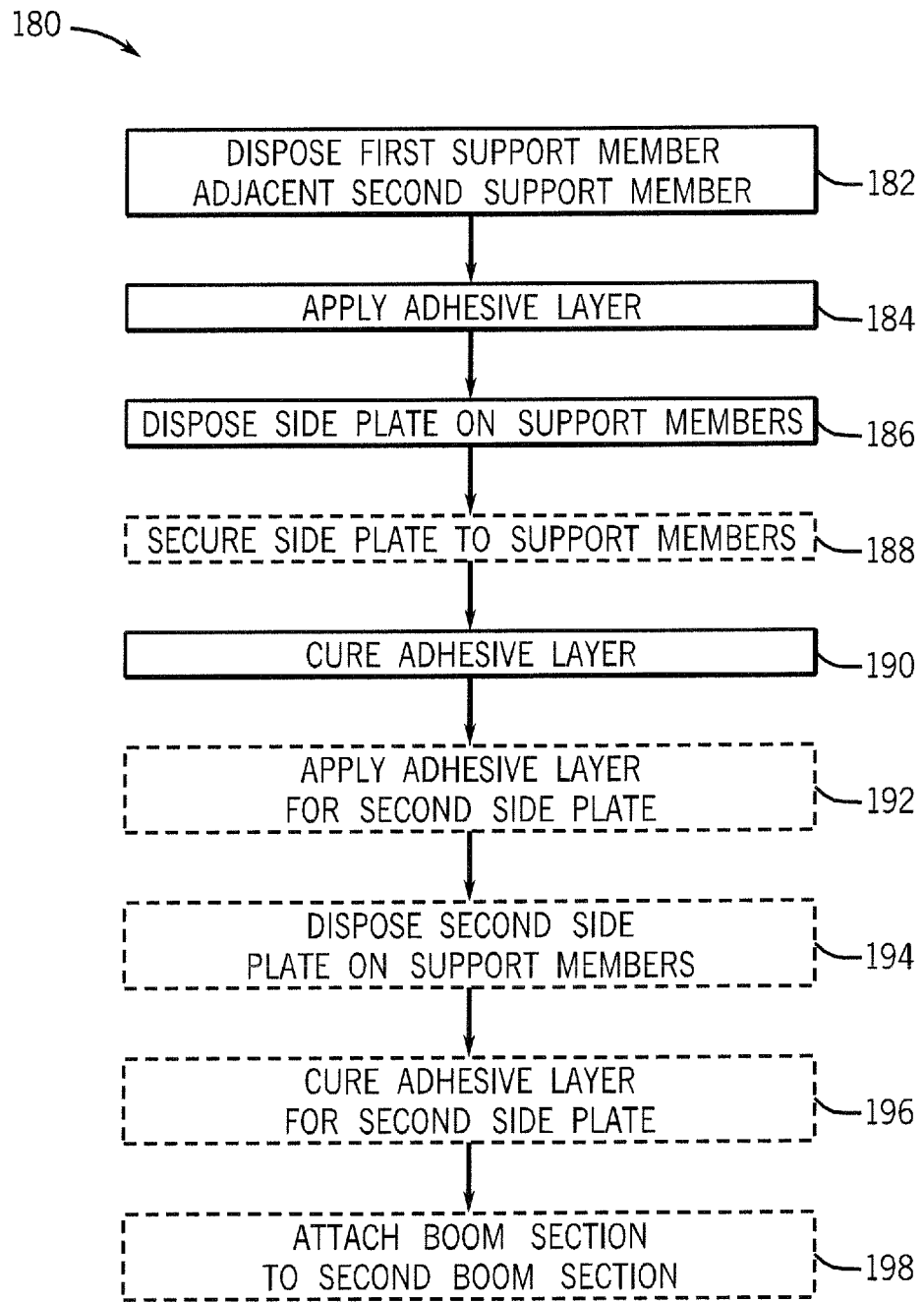
FIG. 7 is an embodiment of a method of manufacturing a boom section by adhesively bonding support members to a side plate.

FIG. 7 is an embodiment of a method 180 of manufacturing a boom section by adhesively bonding support members to a side plate. At step 182, a first support member (i.e., tube) is disposed adjacent to a second support member (i.e., tube). For example, two or more tubes of a boom section may be placed adjacent to one another. Next, at step 184, an adhesive layer is applied to at least one of a first lateral side of the first support member and a side plate, and at least one of a first lateral side of the second support member and the side plate. As previously described, the adhesive layer may include any suitable bonding material, such as epoxy, vinylester resin, or polyester resin, for example. After the adhesive layer is applied, the side plate is disposed on the first and second support members, per step 186, and in certain embodiments, the side plate may be secured to the support members using fasteners, as indicated by step 188. However, in alternative embodiments, the support members may be clamped, or otherwise secured, together during the curing process. With the support members held to the side plate, the adhesive layer is allowed to cure, per step 190.

The cure time may vary depending on the type of adhesive used and/or the temperature of the surrounding environment. For example, in certain embodiments, the adhesive layer may cure in approximately 24 to 72 hours at temperatures of approximately 65 to 130 degrees Fahrenheit. By way of example, in one embodiment, the adhesive layer may cure in approximately 72 hours at approximately 65 degrees Fahrenheit, and in another embodiment, the adhesive layer may cure in approximately 24 hours at approximately 130 degrees Fahrenheit. Furthermore, in certain embodiments, the fasteners may be removed after the adhesive layer is cured.

In some embodiments, an adhesive layer is applied to at least one of the first lateral side of the first support member and a second side plate, and at least one of the first lateral side of the second support member and the side plate, per step 192. As may be appreciated, the second side plate may be placed on an opposite longitudinal end of the support members in relation to the first side plate (e.g., side plates 136 and 142 of FIG. 6), or the second side plate may be placed on the same longitudinal end of the support members on an opposite side from the first side plate (e.g., side plates 136 and 162 of FIG. 6). Next, at step 194, the second side plate may be disposed on the first and second support members. Furthermore, at step 196, the adhesive layer on the second side plate is cured to create a bond between the first and second support members and the second side plate.

At step 198, the boom section may be attached to a second boom section to form a boom. In certain embodiments, multiple boom sections manufactured using the steps of method 180 may be coupled to one another to form a boom. As will be appreciated, fewer or more steps may be performed to manufacture such a boom section. In addition, the steps may be performed in a different order than described. Manufacturing boom sections as described above may enable the sections to be produced faster and/or more efficiently than other manufacturing techniques. For example, certain manufacturing processes involve welding support members to one another to form the boom section frame. As will be appreciated, such processes may be complex and time-consuming Therefore, by replacing the welding process with the bonding process, boom sections may be manufactured more efficiently, thereby decreasing manufacturing costs.

Furthermore, because the adhesive bonding process enables coupling of dissimilar materials (e.g., steel and aluminum), the material of each support member may be particularly selected to provide a lightweight boom that has a desired strength/structural rigidity. For example, a boom that employs adhesively bonded steel and aluminum support members may be significantly lighter than a boom having all steel support members welded to one another. The reduced boom weight decreases the load applied to the vehicle, thereby enabling the use of smaller/less powerful vehicles. Due to the decreased acquisition and operating costs of the smaller/less powerful vehicles, the overhead associated with crop production may be significantly reduced.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural sprayer boom section comprising:
   a first support member having a first longitudinal end and a second longitudinal end;
   a second support member disposed adjacent to the first support member and having a first longitudinal end and a second longitudinal end;
   a third support member positioned at the first longitudinal end of the first support member and the first longitudinal end of the second support member, and arranged crosswise to the first and second support members, wherein the first, second, and third support members extend along a common plane; and
   a flat side plate adhesively bonded to a first lateral side of the first support member proximate to the first longitudinal end of the first support member, to a first lateral side of the second support member proximate to the first longitudinal end of the second support member, and to a first lateral side of the third support member to couple the first support member, the second support member, and the third support member to one another.

2. The boom section of claim 1, wherein the flat side plate comprises a first protrusion extending along the first lateral side of the first support member and a second protrusion extending along the first lateral side of the second support member.

3. The boom section of claim 1, comprising a fourth support member disposed adjacent to the first and second support members, wherein the fourth support member includes a first longitudinal end and a second longitudinal end, the third support member is positioned at the first longitudinal end of the fourth support member, and the flat side plate is adhesively bonded to a first lateral side of the fourth support member proximate to the first longitudinal end of the fourth support member to couple the fourth support member to the first, the second, and the third support members.

4. The boom section of claim 3, wherein the flat side plate comprises a first protrusion extending along the first lateral side of the first support member, a second protrusion extending along the first lateral side of the second support member, and a third protrusion extending along the first lateral side of the fourth support member.

5. The boom section of claim 1, wherein the first support member comprises aluminum, and the third support member comprises steel, or a combination thereof.

6. The boom section of claim 1, wherein the flat side plate is adhesively bonded to the first, the second, and the third support members via an epoxy resin.

7. The boom section of claim 1, comprising a second flat side plate adhesively bonded to a second lateral side of the first support member proximate to the first longitudinal end of the first support member, to a second lateral side of the second support member proximate to the first longitudinal end of the second support member, and to a second lateral side of the third support member.

8. The boom section of claim 1, comprising a plurality of fasteners coupling the flat side plate to the first and second support members.

9. The boom section of claim 1, wherein the flat side plate comprises at least one of carbon fiber and aluminum.

10. An agricultural sprayer boom section comprising:
    a first support member having a first longitudinal end and a second longitudinal end;
    a second support member disposed adjacent to the first support member and having a first longitudinal end and a second longitudinal end; and
    a first flat side plate and a second flat side plate substantially parallel to the first flat side plate, wherein the first flat side plate is adhesively bonded to a first lateral side of the first support member proximate to the first longitudinal end of the first support member and to a first lateral side of the second support member proximate to the first longitudinal end of the second support member, the second flat side plate is adhesively bonded to a second lateral side of the first support member proximate to the first longitudinal end of the first support member and to a second lateral side of the second support member proximate to the first longitudinal end of the second support member, and the first longitudinal end of the first support member and the first longitudinal end of the second support member are coupled to one another only by the first flat side plate and the second flat side plate.

11. The boom section of claim 10, wherein the first flat side plate and the second flat side plate are coupled to the first and second support members by one or more fasteners.

12. The boom section of claim 10, wherein at least one of the first and second flat side plates is adhesively bonded to the first and the second support members via an epoxy resin.

13. The boom section of claim 10, wherein at least one of the first and second flat side plates comprises at least one of carbon fiber and aluminum.

\* \* \* \* \*